United States Patent
Pirvu

(10) Patent No.: US 8,392,898 B2
(45) Date of Patent: *Mar. 5, 2013

(54) RUNNING TIME OF SHORT RUNNING APPLICATIONS BY EFFECTIVELY INTERLEAVING COMPILATION WITH COMPUTATION IN A JUST-IN-TIME ENVIRONMENT

(75) Inventor: Marius Pirvu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,092

(22) Filed: Feb. 6, 2012

(65) Prior Publication Data

US 2012/0144377 A1    Jun. 7, 2012

Related U.S. Application Data

(63) Continuation of application No. 11/837,670, filed on Aug. 13, 2007, now Pat. No. 8,146,065.

(51) Int. Cl.
    *G06F 9/45* (2006.01)
(52) U.S. Cl. ...................................... 717/148
(58) Field of Classification Search .................. 717/140, 717/148, 153; 718/102, 104, 105, 107
    See application file for complete search history.

(56) References Cited

U.S. PATENT DOCUMENTS

| | | | |
|---|---|---|---|
| 5,742,803 A * | 4/1998 | Igarashi et al. | 712/233 |
| 6,463,582 B1 | 10/2002 | Lethin et al. | |
| 6,865,734 B2 * | 3/2005 | Holzle et al. | 717/153 |
| 6,948,172 B1 | 9/2005 | D'Souza | |
| 7,089,544 B2 | 8/2006 | Hickson | |
| 7,100,154 B2 | 8/2006 | Hicks | |
| 7,111,178 B2 | 9/2006 | Rusu et al. | |
| 7,194,385 B2 | 3/2007 | Flautner et al. | |
| 7,379,888 B1 | 5/2008 | Mahapatro | |
| 7,526,634 B1 * | 4/2009 | Duluk et al. | 712/216 |
| 7,735,087 B2 | 6/2010 | Hayashi | |
| 7,844,960 B2 | 11/2010 | Inglis et al. | |
| 7,844,968 B1 | 11/2010 | Markov | |
| 7,954,101 B2 | 5/2011 | Adachi et al. | |
| 2003/0065960 A1 | 4/2003 | Rusu et al. | |
| 2004/0044995 A1 | 3/2004 | Hickson | |
| 2004/0123297 A1 | 6/2004 | Flautner et al. | |
| 2004/0181791 A1 * | 9/2004 | Hayashi | 718/100 |
| 2005/0044538 A1 | 2/2005 | Mantripragada | |
| 2005/0144602 A1 | 6/2005 | Ngai et al. | |

(Continued)

FOREIGN PATENT DOCUMENTS

EP    0908818 A2    4/1999

OTHER PUBLICATIONS

Pirvu et al., "Reducing Compilation Overhead in J9/TR", Oct. 17, 2005, IBM Corporation.*

(Continued)

*Primary Examiner* — Don Wong
*Assistant Examiner* — Daxin Wu
(74) *Attorney, Agent, or Firm* — Yee & Associates, P.C.; David A. Mims

(57) ABSTRACT

Managing just-in-time compilation is provided. The process designates a set of compilation threads for exclusively performing compilation functions associated with an application. A set of computation threads is designated for executing the application. Processor cycles are dynamically allocated during runtime between the set of compilation threads and the set of computation threads to maintain a ratio of processor cycles consumed by the set of compilation threads to processor cycles consumed by the set of computation threads.

16 Claims, 6 Drawing Sheets

U.S. PATENT DOCUMENTS

| | | |
|---|---|---|
| 2006/0048114 A1 | 3/2006 | Schmidt |
| 2006/0095902 A1 | 5/2006 | Nakaike et al. |
| 2007/0016908 A1 | 1/2007 | Kuroda |
| 2007/0061793 A1 | 3/2007 | Inglis et al. |
| 2007/0214335 A1* | 9/2007 | Bellows et al. ............... 711/167 |
| 2008/0010642 A1* | 1/2008 | MacLellan et al. ........... 718/102 |
| 2008/0184194 A1* | 7/2008 | Gaither et al. ................ 717/107 |
| 2009/0049432 A1 | 2/2009 | Pirvu |

OTHER PUBLICATIONS

"The Hyperion system: Compiling multithreaded Jave bytecode for distributed execution"; Antoniu et al., Author manuscript, published in "Parallel Computing 27 (2001) 1279-1297".*

"Interleaving: A Multithreading Technique Targeting Multiprocessors and Workstations", Laudon et al, 1994 ACM 0-89791-660-3/94/0010.*

Whaley, "Partial Method Compilation Using Dynamic Profile Information," OOPSLA '01 Proceedings of the 16th ACM SIGPLAN Conference on Object-Oriented Programming, Systems, Languages, and Applications, Oct. 2001, pp. 166-179.

Agesen et al., "Mixed-Mode Bytecode Execution," Sun Microsystems, Inc., Jun. 2000, 16 pages.

Burke et al., "The Jalapeno Dynamic Optimizing Compiler for Java™," JAVA '99 Proceedings of the ACM 1999 Conference on Java Grande, Jun. 1999, pp. 129-141.

Holm et al., "Compilation of Scientific Programs into Multithreaded and Message Driven Computation," Proceedings of the Scalable High-Performance Computing Conference, May 1994, pp. 518-525.

Ishizaki et al., "Effectiveness of Cross-Platform Optimizations for a Java Just-In-Time Compiler," OOPSLA '03: Proceedings of the 18th Annual ACM SIGPLAN Conference on Object-Oriented Programming, Systems, Languages, and Applications, Nov. 2003, pp. 187-204.

"The Java HotSpot™ Virtual Machine, v1.4.1, d2" Sun Microsystems, Inc., Technical White Paper, Sep. 2002, 28 pages.

Krintz et al., "Reducing the Overhead of Dynamic Compilation," Software—Practice and Experience, 31:717-738, 2001.

Krintz et al., "Using Annotations to Reduce Dynamic Optimization Time," Proceedings of the ACM SIGPLAN 2001 Conference on Programming Language Design and Implementation, Jun. 2001, pp. 156-167.

Pirvu et al., "Reducing Compilation Overhead in J9/TR," IBM Corporation, Oct. 17, 2005, 16 pages.

Suganuma et al., "A Dynamic Optimization Framework for Java Just-In-Time Compiler," OOPSLA '01 Proceedings of the 16th ACM SIGPLAN Conference on Object-Oriented Programming, Systems, Languages, and Applications, Oct. 2001, pp. 180-195.

Unnikishnan et al., "Reducing Dynamic Compilation Overhead by Overlapping Compilation and Execution," ASP-DAC '06 Proceedings of the 2006 Asia and South Pacific Design Automation Conference, Mar. 2006, 929-934.

Wang et al., "Scheduling Fixed-Priority Tasks with Preemption Threshold," RTCSA '99 Sixth International Conference on Real-Time Computing Systems and Applications, Dec. 199, pp. 328-335.

USPTO Office Action regarding U.S. Appl. No. 11/837,670, dated May 26, 2011, 21 pages.

USPTO Response to Office Action regarding U.S. Appl. No. 11/837,670, dated Aug. 26, 2011, 17 pages.

USPTO Notice of Allowance regarding U.S. Appl. No. 11/837,670, dated Dec. 12, 2011, 34 pages.

* cited by examiner

RUNNING TIME OF SHORT RUNNING APPLICATIONS BY EFFECTIVELY INTERLEAVING COMPILATION WITH COMPUTATION IN A JUST-IN-TIME ENVIRONMENT

This application is a continuation of application Ser. No. 11/837,670, filed Aug. 13, 2007, status allowed.

BACKGROUND OF THE INVENTION

1. Field of the Invention

The present invention is related generally to a data processing system and in particular to a method and apparatus for compiling code. More particularly, the present invention is directed to a computer implemented method, apparatus, and computer usable program code for improving the running time of short running applications in a just-in-time environment by controlling interleaving of compilation with computation.

2. Description of the Related Art

Just-in-time (JIT) compilation, also referred to as dynamic translation, is a method for converting software code from one format into another during runtime. In one example, JIT compilation converts bytecode into native machine code.

Bytecode is a binary representation of program code that is an intermediate representation between source code and machine code. Bytecode is portable and can generally be compiled into machine code during runtime much faster than source code can be compiled into machine code. Bytecode may be converted into native machine language for execution of the native machine language and/or the bytecode may be executed directly on a virtual machine.

For software systems that compile applications using JIT compilation, compilation time is inherently part of the application's running time. Most of the compilation activity takes place during the initial stages of an application runtime. The time that it takes to compile the bytecode during the initial execution of the application is sometimes referred to as a startup time delay. Systems that compile software code using the JIT compiler work best with applications that run for a long time. These long running applications tend to minimize or amortize the startup time delay over a long run time period. However, the startup time delay in JIT compilation may result in a more noticeable or unacceptable delay that could hinder or negatively impact runtime performance in short running software applications and in the startup of big server applications.

Another problem with runtime compilation is that it may create a delay in the execution flow of an application. This makes graphical applications look jerky. It may also cause interactive applications to appear unresponsive. For all of these reasons, JIT compilers have traditionally refrained from using expensive or aggressive optimizations and relied primarily on cheaper or less aggressive optimizations that provide the best performance advantages for a given optimization.

The most common solution to address the compilation overhead problem is adaptive compilation. Most programs spend the vast majority of their time executing a few key routines. In this solution, the virtual machine (VM) identifies hot methods at runtime. A hot method, also referred to as a hot spot, refers to a part or portion of code, such as an algorithm, routine, or method, where a significant amount of time is being spent by the processor during execution of the code. In this solution, the virtual machine restricts JIT compilation activity to this small set of hot methods. In other words, the virtual machine compiles only the hot methods. The less important methods are interpreted rather than compiled by the JIT compiler at runtime.

As virtual machines evolved, they began to offer JIT compilers with multiple optimization levels. For instance, a virtual machine could provide a three level execution engine that includes an interpreter, a fast-non-optimizing compiler, and a slow optimizing compiler. Similarly, another solution provides three compilers with different capabilities: a baseline compiler that mimics a stack machine, a "quick" compiler that provides a very low level of optimization, and a full-fledged optimizing compiler. As another example, the IBM® J9 Virtual Machine (J9 VM) from International Business Machines Corporation offers an even higher granularity in terms of optimization levels. The hotter the method, the more optimizations are applied during compilation of the method.

These approaches can alleviate the overhead of compilation, but only if the application in question has clear hot-spots. For applications with flat execution profiles where most of the methods are more or less equally important, the benefit of dynamic compilation is seriously diminished. For example, in big server-side applications, like the Java™ 2 Enterprise Edition platform (J2EE) application servers, the sheer number of methods coupled with the absence of a clear hot-spot can significantly delay the startup of such applications. This is particularly important for servers that need to recover rapidly after a crash or power failure.

Short running applications can also be negatively affected by JIT compilation even in the presence of hot-spots because there may not be enough time to amortize the cost of compilation during runtime. It is not uncommon to spend a lot of time compiling only to have the application end soon thereafter. For example, if an application is very short, ninety percent (90%) of the runtime may be spent compiling the code and only ten percent (10%) of the runtime may be spent on computation tasks associated with running the actual application or performing the actual work the application is intended to perform. The end result is that a very large percentage of the application's time is spent compiling rather than performing useful work.

SUMMARY OF THE INVENTION

The illustrative embodiments provide a computer implemented method, apparatus, and computer usable program code for managing just-in-time compilation. In one embodiment, the process designates a set of compilation threads for exclusively performing compilation functions associated with an application. A set of computation threads is designated for executing the application. Processor cycles are dynamically allocated during runtime between the set of compilation threads and the set of computation threads to maintain a ratio of processor cycles consumed by the set of compilation threads to processor cycles consumed by the set of computation threads.

Dynamically allocating processor cycles between the set of compilation threads and the set of computation threads during runtime may include changing a compilation priority for a compilation thread in the set of compilation threads, changing an optimization level of a compilation thread in the set of compilation threads, and/or yielding a processor, by the set of compilation threads, to the set of computation threads.

The ratio of processor cycles consumed by the set of compilation threads to processor cycles consumed by the set of computation threads is identified. The ratio may be predetermined prior to commencement of compilation, identified as a user definable ratio value that is specified by a user command, and/or identified as a ratio that varies as a function of a total amount of time spent on compilation of the application and a total amount of time spent on execution of the application.

The ratio may be identified as a constant value or be identified dynamically during runtime. The ratio may be identified dynamically during runtime as a ratio that varies during runtime as a proportion of processor cycles allocated to the set of compilation threads decreases as a total amount of time spent on compilation increases. In another example, the ratio varies during runtime as a proportion of processor cycles allocated to the set of compilation threads increases as a total amount of time spent on compilation increases.

In other aspects, the present invention is directed towards systems and computer program products for implementing the above-described process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
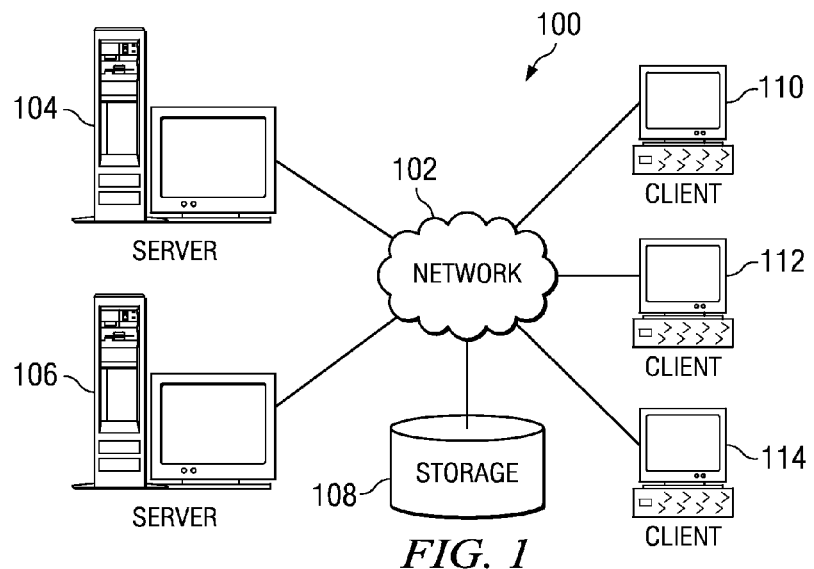
FIG. 1 is a pictorial representation of a network of data processing systems in which illustrative embodiments may be implemented.
Figure 2:
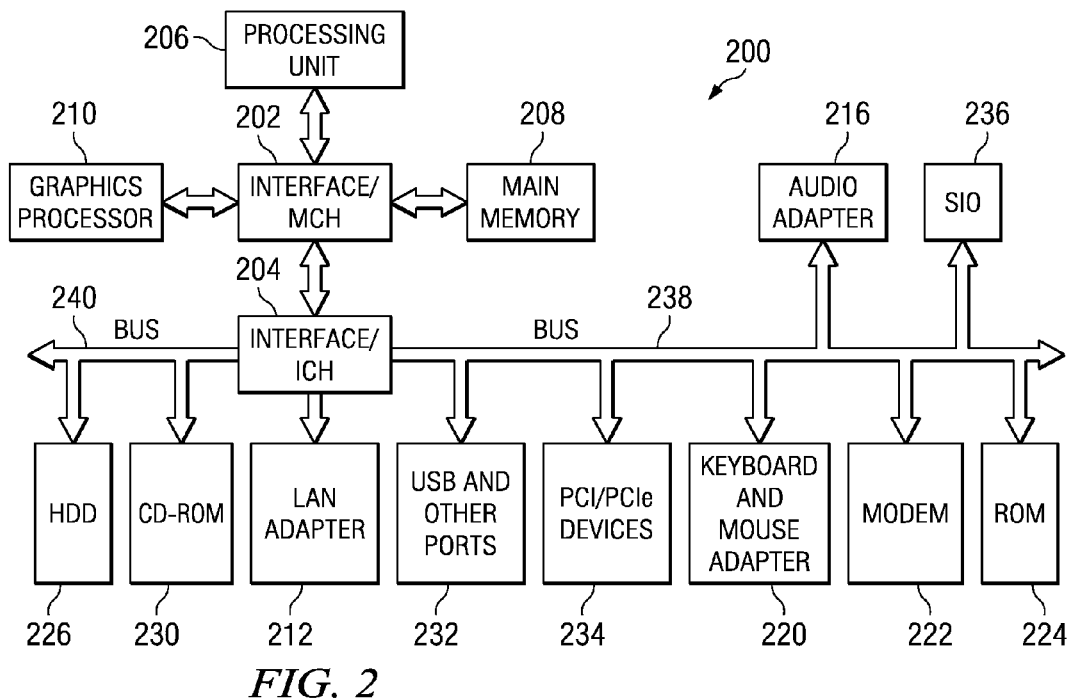
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In this example, client 110 includes a virtual machine for interpreting and running bytecode in a just-in-time environment. A just-in-time (JIT) environment is any type of computing environment in which a virtual machine utilizes a just-in-time (JIT) compiler to translate bytecode into machine language as necessary at runtime. As used herein, a JIT compiler is a software component that converts code from one format into another during runtime. For example and without limitation, a JIT compiler may be used to convert bytecode into native machine code.

In one example, a compiler associated with client 110 converts source code into bytecode. The bytecode is translated and executed on a virtual machine on client 110. The virtual machine includes a JIT compiler that translates the bytecode into native machine code during runtime.

In another example, a compiler on client 110 compiles source code into bytecode. The bytecode is portable such that client 110 can transmit or send the bytecode to client 112 for execution. The bytecode may be sent from client 110 to client 112 via network 102. In this example, client 112 executes the bytecode in a virtual machine located on client 112. The virtual machine, in this example, includes a JIT compiler that converts the bytecode into native machine code for client 112. Network data processing system 100 may include additional servers, clients, compilers, networks, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows™ Vista™ (Microsoft, Windows and Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or central processing units (CPUs). The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize that for long running applications, it is generally better to compile as much of the application as possible from the very beginning. But, for short running applications, the opposite is generally true.

However, current virtual machines in JIT environments generally cannot estimate the duration of an application runtime with sufficient accuracy. Therefore, to improve performance for the general case, it may be beneficial to interleave compilation with computation. Although current operating systems (OS) may perform some interleaving, the interleaving decisions taken by the OS may be suboptimal because the OS is not aware of the specific details of the application.

For example, if the operating system uses round-robin scheduling and an executing application uses many working threads while the virtual machine typically implements a single compilation thread, then too few processor or central processing unit (CPU) resources will be allocated for compilation and the performance may suffer. Conversely, if the application has a single working thread, but the virtual machine uses multiple compilation threads or a single compilation thread with a high priority level, too many CPU resources will be allocated for compilation and the application may progress at a slower pace. Therefore, the illustrative embodiments recognize a need for effectively controlling interleaving of compilation with computation in a JIT environment.

The illustrative embodiments provide a computer implemented method, apparatus, and computer usable program code for managing JIT compilation. In one embodiment, the process designates a set of compilation threads for exclusively performing compilation functions associated with an application. A set of computation threads is designated for executing the application. Processor cycles are dynamically allocated during runtime between the set of compilation threads and the set of computation threads to maintain a ratio of processor cycles consumed by the set of compilation threads to processor cycles consumed by the set of computation threads.

The term dynamic refers to an action that may be adjusted and/or modified during occurrence of the action to adjust for changing conditions as the action occurs. For example, without limitation, dynamically allocating refers to allocation that occurs during runtime, as an application code is being executed. The allocation may be performed and/or adjusted based on changing conditions during runtime as the allocation is performed. Thus, if compilation becomes too processor intensive, the allocation of processor cycles may be dynamically set, modified, adjusted, or changed during runtime to take into account or adjust for the excessive processor resources being consumed by compilation.

Thus, the different embodiments may allow for improved interleaving of compilation with computation during runtime by inhibiting the system from spending more than a certain amount of processor resources on compilation. Compilations are handled by one or more separate threads which work asynchronously to the other computation threads of the application. As used herein, a computation thread is a thread associated with carrying out the actual work of the application. In other words, the computation threads are threads performing the computations and performing the functions of the application. Compilation threads are threads for compiling, optimizing, translating, and/or converting code associated with the application from one format to another.

Figure 3:
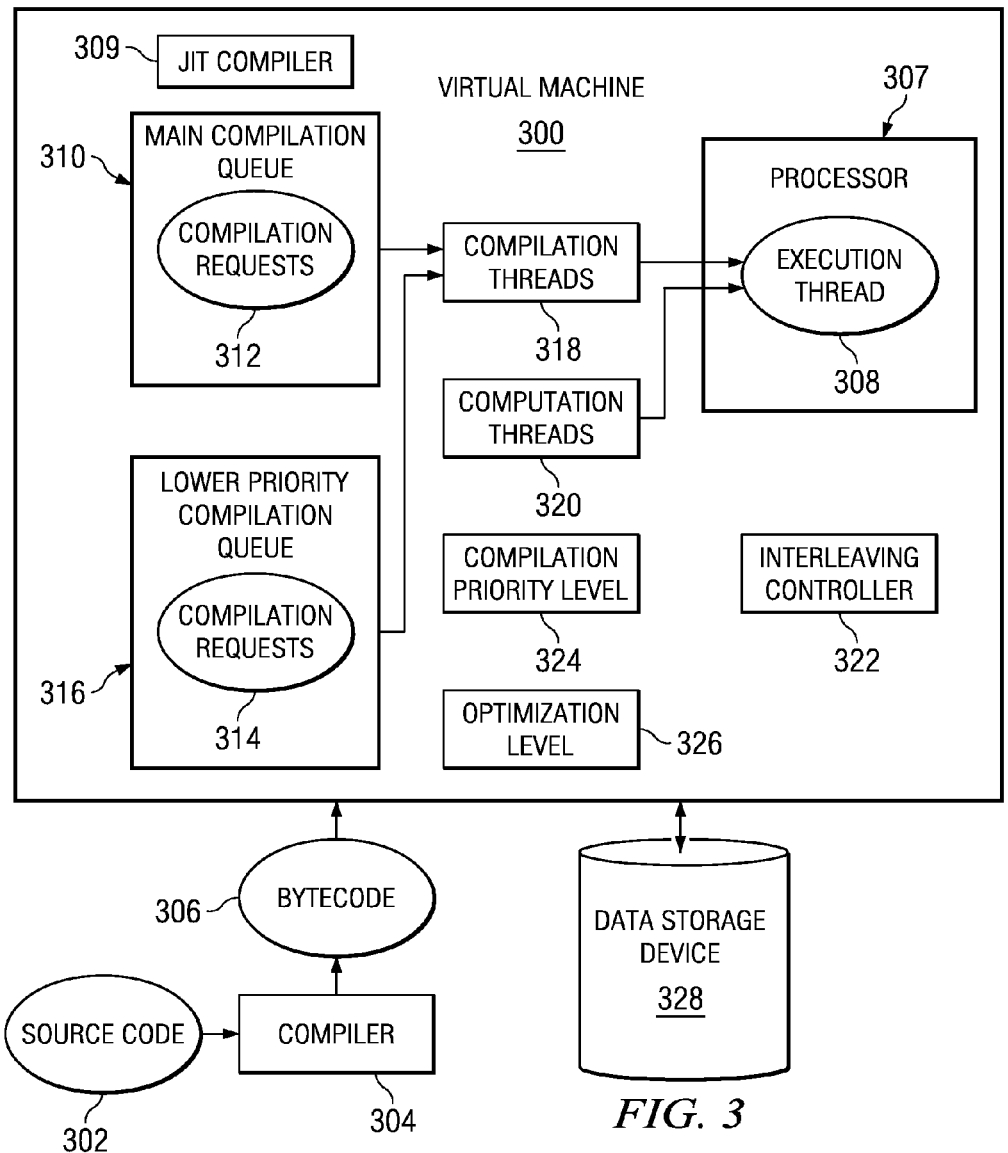
FIG. 3 is a block diagram illustrating a virtual machine capable of controlling the interleaving of compilation with computation in a just-in-time environment in accordance with an illustrative embodiment.

Turning now to FIG. 3, a block diagram illustrating a virtual machine capable of controlling the interleaving of compilation with computation in a just-in-time environment is depicted in accordance with an illustrative embodiment. Virtual machine 300 is software that creates a virtualized environment within a computing device, such as, but not limited to, client 110 in FIG. 1. Virtual machine 300 may be implemented in any type of known or available virtual machine. In this example, virtual machine 300 is a Java virtual machine.

An application written in source code 302 is loaded into compiler 304. Compiler 304 may be any type of compiler for compiling source code into bytecode 306. In this example, compiler 304 is a javac Java programming language compiler.

Compiler 304 converts source code 302 into bytecode 306. Bytecode 306 is an intermediate binary representation of an application designed to be executed by virtual machine 300 instead of being executed by dedicated hardware. In other words, bytecode 306 is not the native machine code for a particular computer.

Bytecode 306 is interpreted, compiled, and/or executed on virtual machine 300. Virtual machine 300 utilizes just-in-time (JIT) compiler 309 to convert bytecode 306 into native machine code during runtime. This process of dynamically translating bytecode 306 into machine code may be referred to as just-in-time (JIT) compilation or dynamic translation.

JIT compiler 309 may be implemented as any type of known or available JIT compiler. In this example, JIT compiler 309 is a Java JIT compiler.

A set of compilation threads are designated to exclusively perform compilation functions associated with JIT compilation of the application bytecode 306. A set of computation threads are also designated to exclusively perform the work or executing of the application. As used herein, the term "set of" may refer to one or more. Thus, the set of compilation threads may include one or more compilation threads.

Processor 307 may be implemented using any type of known or available processor, such as, without limitation, processor unit 206 in FIG. 2. Processor 307 may be, but is not limited to, a central processing unit (CPU) or a digital signal processor (DSP). Executing thread 308 is the thread that is currently utilizing the resources of processor 307 for executing code, performing tasks, optimization, compilation, or otherwise using processor cycles.

During runtime, processor 307 can only execute one thread at a time. The process interleaves or alternates allocation of processor cycles between the set of compilation threads and the set of computation threads.

Main compilation queue 310 includes compilation requests 312 in the set of compilation threads that are requesting processor cycles for executing compilation tasks. Lower priority compilation queue 316 is a queue for compilation requests 314 in the set of compilation threads that have been assigned or given a lower compilation priority. In another embodiment, the same set of compilation threads are used to serve both main compilation queue 310 and lower priority compilation queue 316. When serving a request from lower priority compilation queue 316, the priority of the compilation thread in the set of compilation threads is lowered.

During a compilation interval when processor cycles have been allocated to the set of compilation threads, compilation requests 312 in main compilation queue 310 will be given priority for utilization of processor cycles over compilation requests 314 in lower priority compilation queue 316. Compilation requests 314 in lower priority compilation queue 316 will only be allocated processor cycles for compilation tasks after all compilation requests 312 have finished compiling. In other words, the compilation requests from lower priority compilation queue 316 are processed by processor 307 when no other requests are present in main compilation queue 310.

When processing requests from lower priority compilation queue 316 the priority of the compilation thread is lowered sufficiently so that the negative impact on the application's performance is negligible. In one embodiment, these low priority requests are processed when virtual machine 300 detects idle time in processor 307.

Computation threads 320 is a set of one or more computation threads associated with an application that is being executed. As used herein, a computation thread is a thread that is performing the work or functions of the application. Computation threads 320 execute the application itself, as opposed to compiling, translating, optimizing, or otherwise converting the code from one format into another.

Interleaving controller 322 is a software component associated with virtual machine 300 and JIT compiler 309 for controlling interleaving or allocating of processor cycles between the set of compilation threads and the set of computation threads. Interleaving controller 322 identifies a target ratio of processor cycles to be consumed by the set of compilation threads 318 and processor cycles to be consumed by computation threads 320. The main task of interleaving controller 322 is to affect the interleaving of compilation and computation threads such that the resulting ratio of CPU resources consumed for compilation and CPU resources consumed for computation closely follows the target ratio.

The allocation of processor cycles to compilation threads 318 and computation threads 320 is performed by a thread scheduler implemented by the operating system (OS). To achieve its goal, interleaving controller 322 performs specific actions that will influence the allocation of processor cycles between compilation threads 318 and computation threads 320. This may be accomplished, for example and without limitation, by changing thread priority or yielding the CPU to computation thread(s). Yielding the CPU to computation threads refers to the compilation threads ceasing to utilize the processor for compilation and/or allowing computation threads to utilize the processor for computation functions or computation work.

Interleaving controller 322 utilizes compilation priority level 324 to determine the level of priority for each thread in compilation requests 312-314. Lower priority compilation queue 316 is used for upgrade requests. If compilation threads 318 consume more than their allocated processor or CPU resources, interleaving controller 322 may lower optimization level 326 for the method associated with execution thread 308 that is compiling, to minimize compilation resources. However, the resulting code may not be as good as it can be. Therefore, the compilation request is cloned and placed in a lower priority compilation queue 316. In one embodiment, interleaving controller 332 clones the compilation request. In another embodiment, compilation threads 318 may perform cloning of the compilation request.

When time permits, such as when main compilation queue 310 is empty and the processor resources allocated to compilation have not been exhausted or completely used, this cloned compilation request will be served and the method associated with the compilation request will be re-compiled with higher optimization levels. As used herein, a method is a subroutine that is associated with a class or an object in object oriented programming.

The processor resources allocated to compilation may be referred to as a budget or a compilation budget. If the amount of resources used exceeds the resources allocated, a budget deficit may occur. If the processor resources used for compilation are less than the resources allocated to compilation, a budget surplus may occur.

Interleaving controller 322 can be implemented in a distributed fashion by compilation threads 318 themselves which would typically take decisions to control the compilation/computation interleaving just before a compilation request is processed. In another embodiment interleaving controller 322 is implemented by a separate thread which wakes up periodically, or when certain events of interest arise, and takes interleaving decisions. In yet another embodiment, the algorithm of the interleaving controller 322 is implemented both by compilation threads 318 and by a separate, dedicated thread.

Optimization level 326 is a level of optimization to be performed during compilation. Optimization may be an expensive process in terms of time and/or processor resources. The higher or more aggressive the optimization level, the more processor cycles and/or processor resources are required to perform the JIT compilation. Therefore, if compilation threads become over-budget or begin to require more than the allocated processor cycles, interleaving controller 322 may lower optimization level 322 for the currently executing compilation thread to decrease the processor resources required to complete compilation.

Compilation priority level 324 and optimization level 326 are determined at runtime and/or derived from command line options. In this example, compilation priority level 320 and optimization level 322 are generated dynamically and/or updated/modified by interleaving controller 322 at runtime. In another embodiment, compilation priority level 320 and/or optimization level 322 may be user defined values. In this example, a user may supply values for compilation priority level 320 and/or optimization level 322 prior to initiating JIT compilation and/or during runtime.

In another example, compilation priority level 320 and/or optimization level 322 are initially retrieved from data storage device 328, received from a user, or otherwise received from another software program and/or computing device as default values that are pre-calculated or received prior to initiating JIT compilation. Interleaving controller 322 may then modify or update the values for compilation priority level 320 and/or optimization level 322 during runtime as necessary to maintain the ratio of processor cycles utilized by compilation requests 312-314 and computation requests 320.

In yet another embodiment, compilation priority level 320 and/or optimization level 322 may be a variable or dynamic ratio value that is calculated during runtime as a function of the total time spent on compilation of the application and execution of the application. In another example, the ratio is calculated dynamically during runtime such that the proportion of processor cycles allocated to the at least one compilation thread decreases as the total runtime increases. In yet another embodiment, the ratio may also be calculated dynamically during runtime such that the proportion of processor cycles allocated to the at least one compilation thread increases as the total runtime increases.

Data storage device 328 is any type of known or available device for storing data, including, but not limited to, a hard disk, a flash memory, main memory, a database, a filesystem, a read-only memory (ROM), a non-volatile random access memory (NV RAM), or any other type of data storage device. For example, data storage device 328 may be a device such as, without limitation, storage 108 in FIG. 1. Data storage device 328 may be used to store source code 302, bytecode 306, and/or any other data.

Figure 4:
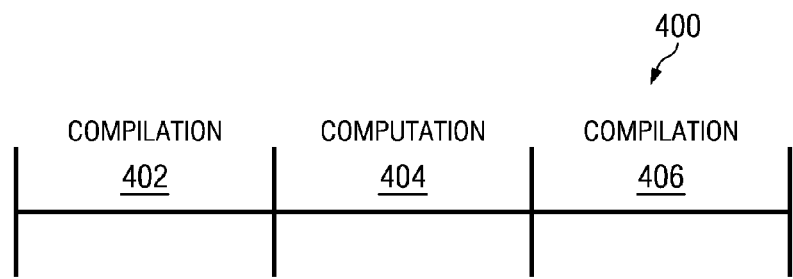
FIG. 4 is a block diagram illustrating a compilation budget in accordance with an illustrative embodiment.

FIG. 4 is a block diagram illustrating a compilation budget in accordance with an illustrative embodiment. An interleaving controller logically divides the execution timeline in a succession of back-to-back time intervals of fixed size. Each interval, such as interval 400, designates processor cycles or processor time allocated to compilation and computation threads.

In this example, during interval 400, an interleaving controller interleaves compilation with computation throughout the interval. When compilation 402 is over, the compilation thread yields the processor to computation threads. Computation 404 is time or processor cycles allocated to computation. After computation 404 is complete or ends, an interleaving controller then allocates processor resources back to compilation threads at compilation 406.

A compilation budget is the amount of time or CPU cycles allotted to compilation during a time interval. The compilation budget can also be expressed as a percentage or ratio of time spent compiling to the total duration of the time interval. For example, if the duration of the time interval is 100 ms, then a compilation budget of 30 ms can also be expressed as 30% or as 0.3.

As CPU cycles are used to perform JIT compilation, the compilation budget diminishes. However, the compilation budget is replenished at the beginning of each time interval with a fixed value which represents the target of spending CPU resources for compilation and computation. For example, if the time interval is 100 ms and the target ratio of compilation to computation cycles is 40/60, then the compilation budget will be replenished at the beginning of a time interval with 40/(40+60)*100 ms=40 ms worth of CPU time.

A compilation budget is also affected by any budget deficits or surpluses carried over from the previous time interval. A budget deficit happens when, at the end of a time interval, the virtual machine consumed more CPU time for JIT compilation than its allocated compilation budget. A budget deficit that is carried over decreases the available budget for the next interval. A budget surplus happens when, at the end of a time interval, the virtual machine did not spend all the CPU resources dedicated for JIT compilation in the current time interval. A budget surplus that is carried over increases the available budget for the next time interval.

When a compilation thread needs to compile a method, the interleaving controller determines the percentage of time spent compiling for the current time interval 400. If this percentage starts to reach a certain target threshold, the interleaving controller lowers the priority of the compilation thread. If the compilation budget is exceeded, the interleaving controller can direct the compilation thread to yield the processor to computation threads. The compilation budget deficit, if any, is carried over into the next time interval. If the deficit grows too large and/or the size of the compilation queue, such as main compilation queue 310 in FIG. 3, grows too large, the interleaving controller can lower the optimization level of the method being compiled. When this happens, the interleaving controller can clone the compilation request and add it to a separate, low priority queue, such as lower priority compilation queue 316 in FIG. 3, to be recompiled later on when time permits, with full optimization.

In another embodiment, if the current time interval is about to end and there is still plenty of compilation budget available, the interleaving controller can raise the priority of the compilation thread in order to consume this budget and better interleave compilation with computation. The budget surplus, if any, can be carried over into the next compilation time interval, but only up to a certain limit or threshold amount of carry-over budget. This limit or threshold of carry-over budget is to prevent situations where the budget is accumulated over long periods of time and then spent all at once, which would defeat the purpose of interleaving computation with compilation. Additionally, if there is no budget deficit, but there is plenty of processor idle time, the virtual machine can increase the optimization level of the methods being compiled to improve the quality of the generated code.

In this example, compilation and computation are interleaved throughout an interval. In another embodiment, a whole interval is allocated to compilation threads and another interval is allocated to computation threads, rather than interleaving compilation with computation during the single interval.

Figure 5:
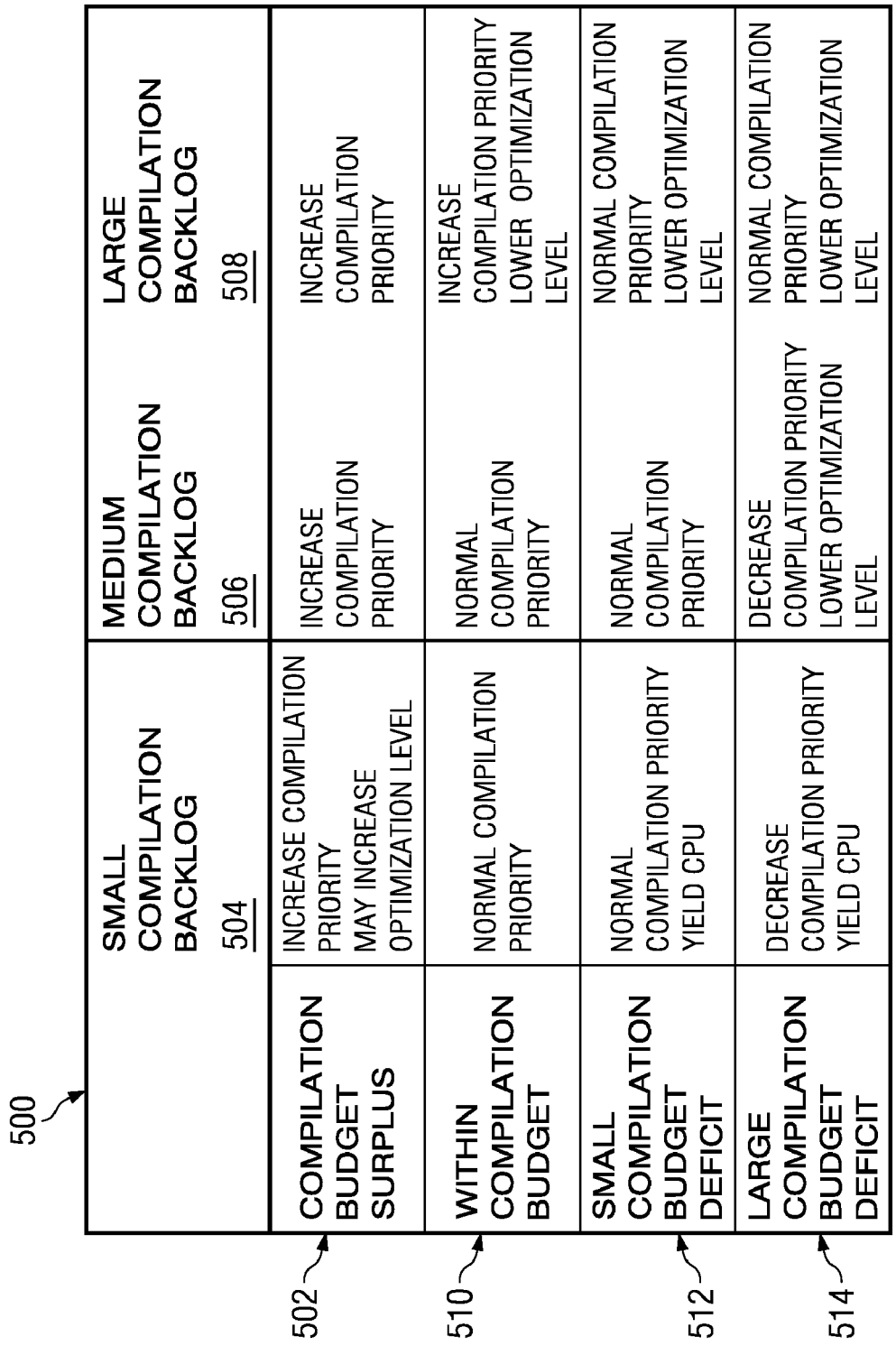
FIG. 5 is a block diagram illustrating a table of actions taken by an interleaving controller in accordance with an illustrative embodiment.

Referring now to FIG. 5, a block diagram illustrating a table of actions taken by an interleaving controller is depicted in accordance with an illustrative embodiment. Table 500 summarizes possible actions taken by an interleaving controller associated with a virtual machine based on the computed compilation budget and the observed compilation backlog. In particular, the actions are examples of actions that may be performed by interleaving controller 322 in FIG. 3. In this example, the actions are not part of a data structure that is stored. Instead, the actions may be determined as part of a policy or a set of rules used by the interleaving controller. In other words, in FIG. 5, the actions shown are examples of actions that may be taken or initiated by the interleaving controller as a result of applying a policy or a set of rules to the computed compilation budget and the observed compilation backlog.

The compilation backlog can be expressed as the size of the compilation queue, or, in another embodiment, it may use an estimation of how much processor or CPU time is needed to compile all methods in the compilation queue. The estimation of how much CPU time is needed could include factors like the size of methods, whether or not the methods contain back-edges, or any other factors influencing utilization of CPU time.

If interleaving controller identifies a compilation budget surplus 502 and a small compilation backlog 504, the interleaving controller may increase compilation priority and/or increase an optimization level for the compilation thread. If interleaving controller identifies a medium compilation backlog 506 or a large compilation backlog 508 with the compilation budget surplus 502, the interleaving controller increases the compilation priority of the compilation thread.

If the compilation processor usage in the current time interval is within the compilation budget 510, the interleaving controller will continue at the normal or current compilation priority for the compilation thread if either a small compilation backlog 504 or a medium compilation backlog 506 is present. However, if a large compilation backlog 508 is present, the interleaving controller may increase compilation priority of the compilation thread to solve the backlog and/or lower the optimization level of the compilation thread to prevent future budget deficits.

If the interleaving controller identifies a small compilation budget deficit 512, the interleaving controller, in this example, will continue with the normal or current compilation priority. If there is a small compilation backlog 504, the interleaving controller may also yield the processor to the set of computation threads. If the backlog is large 508, the interleaving controller may lower the optimization level of the compilation thread to increase the efficiency of compilation and decrease usage of processor resources during compilation.

When a large compilation budget deficit 514 and a small compilation backlog 504 occurs, the interleaving controller will decrease compilation priority and/or yield the processor to computation thread(s). If the backlog is a medium compilation backlog 506, the interleaving controller, in this example, decreases compilation priority and/or lowers the optimization level of the compilation thread to reduce the processor resources utilized by the compilation thread. If a large compilation backlog 508 and a large compilation budget deficit 514 occur, the interleaving controller can allow the normal compilation priority to continue and lower the optimization level of the compilation thread to allow the compilation backlog to be reduced while decreasing the amount of processor resources being used during compilation so as to reduce the budget deficit.

The examples shown in FIG. 5 illustrate one possible embodiment for managing interleaving of compilation with computation in a JIT environment. However, the illustrative embodiments are not limited to this embodiment. In other words, any combination of dynamically changing a priority of a compilation thread, yielding a processor to a computation thread, and/or adjusting optimization levels either upward or downward may be utilized to improve compilation/computation interleaving with short running applications.

Figure 6:
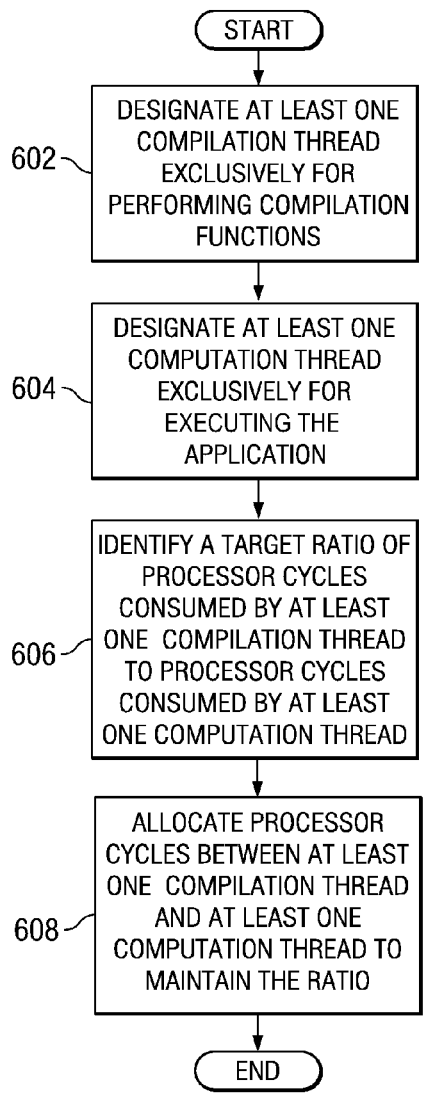
FIG. 6 is a flowchart illustrating a process for compiling an application in bytecode into native machine code at runtime in accordance with an illustrative embodiment.

FIG. 6 is a flowchart illustrating a process for compiling an application in bytecode into native machine code at runtime in accordance with an illustrative embodiment. The process in FIG. 6 may be implemented by a virtual machine having a just-in-time compiler, such as virtual machine 300 in FIG. 3.

The process begins by designating at least one compilation thread exclusively for performing or executing compilation functions (step 602). The process designates at least one computation thread exclusively for executing the application (step 604). (Note that, alternatively, step 604 may be performed before step 602.) A computation thread is designated as exclusively for executing the application or exclusively for performing computation functions if the thread only performs computation functions and does not perform compilation functions. In other words, the thread does not perform any compilation or optimization functions on the application code. Instead, the thread executes the compiled code to perform work associated with the application. A computation thread may also be referred to as a working thread for performing the work of the application.

The process identifies a target ratio of processor cycles consumed by the at least one compilation thread to processor cycles consumed by the at least one working thread (step 606). Step 606 may alternatively be performed between steps 602 and 604, or before both step 602 and 604. The process dynamically and continuously allocates processor cycles between the at least one compilation thread and the at least one computation thread to maintain the ratio (step 608) with the process terminating thereafter.

In this example, the ratio is a ration value that is predetermined or pre-calculated prior to commencement or initiation of compilation. In another embodiment, the ratio value may be specified by a user command or a ratio value that is retrieved by a database or other data storage device, such as storage 108 in FIG. 1.

In this example in FIG. 6, the ratio is a constant value. However, in another embodiment, the ratio may also be a variable or dynamic ratio value that is calculated during runtime as a function of the total time spent on compilation of the application and execution of the application. In another example, the ratio is calculated dynamically during runtime such that the proportion of processor cycles allocated to the at least one compilation thread decreases as the total runtime increases. In yet another embodiment, the ratio may also be calculated dynamically during runtime such that the proportion of processor cycles allocated to the at least one compilation thread increases as the total runtime increases.

Figure 7:
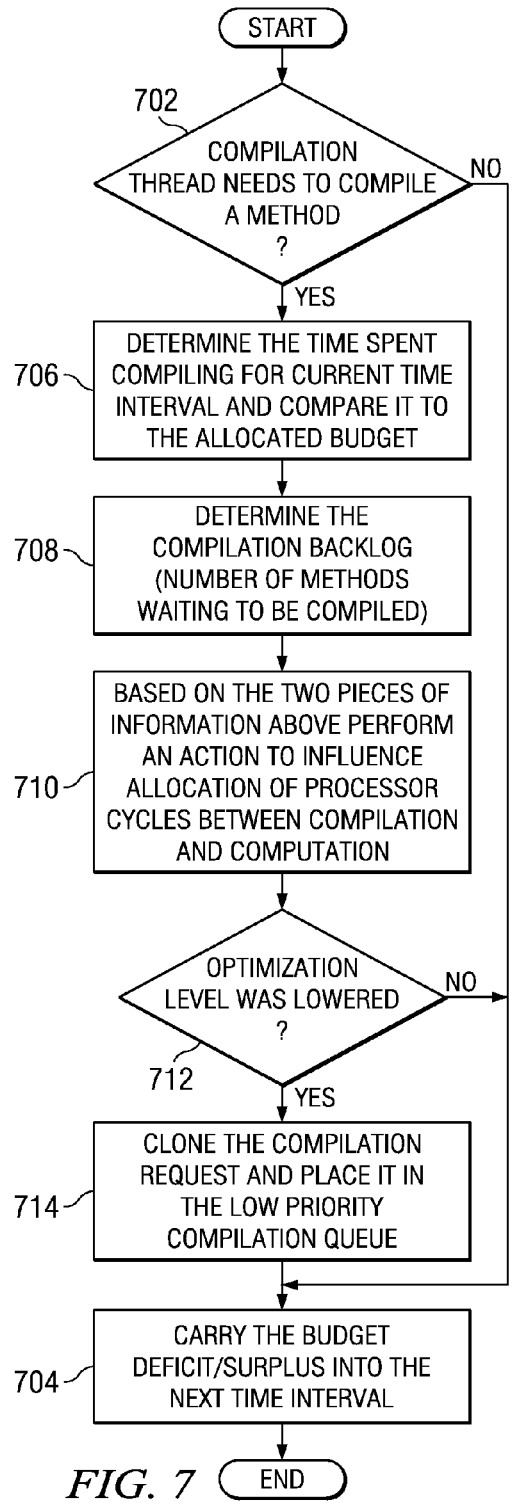
FIG. 7 is a flowchart illustrating a process for interleaving computation and compilation at runtime in accordance with an illustrative embodiment.

FIG. 7 is a flowchart illustrating an exemplary process for interleaving computation and compilation at runtime in accordance with an illustrative embodiment. The process in FIG. 7 is a more detailed representation of step 608 in FIG. 6. The process in FIG. 7 may be implemented by software for controlling interleaving between compilation and computation threads, such as interleaving controller 322 in FIG. 3.

The process begins by making a determination as to whether a compilation thread needs to compile a method (step 702). This determination may be made by checking a compilation queue. If a compilation thread does not need to compile a method, the process carries the budget deficit or surplus into the next time interval (step 704). The process terminates thereafter.

Returning to step 702, if a compilation thread does need to compile a method, the process determines a time spent compiling for the current time interval and compares the amount of time spent to the allocated budget (step 706). The process then determines the compilation backlog (step 708). Based on the amount of time spent compiling, the allocated budget for the current time interval and the compilation backlog, the process performs a specific action that will influence the allocation of processor cycles between compilation threads and computation threads, such as, without limitation, changing thread priority or yielding the CPU, as described in FIG. 5 (step 710).

The process then makes a determination as to whether the action taken in step 710 included lowering an optimization level of the method (step 712). If the optimization level was lowered, the process clones the compilation request and places it in the low priority compilation queue (step 714). If the optimization level was not lowered at step 710 or after the compilation request has been cloned and placed in the low priority queue in step 714, the process carries the budget deficit or budget surplus into the next time interval (step 704) with the process terminating thereafter.

Figure 8:
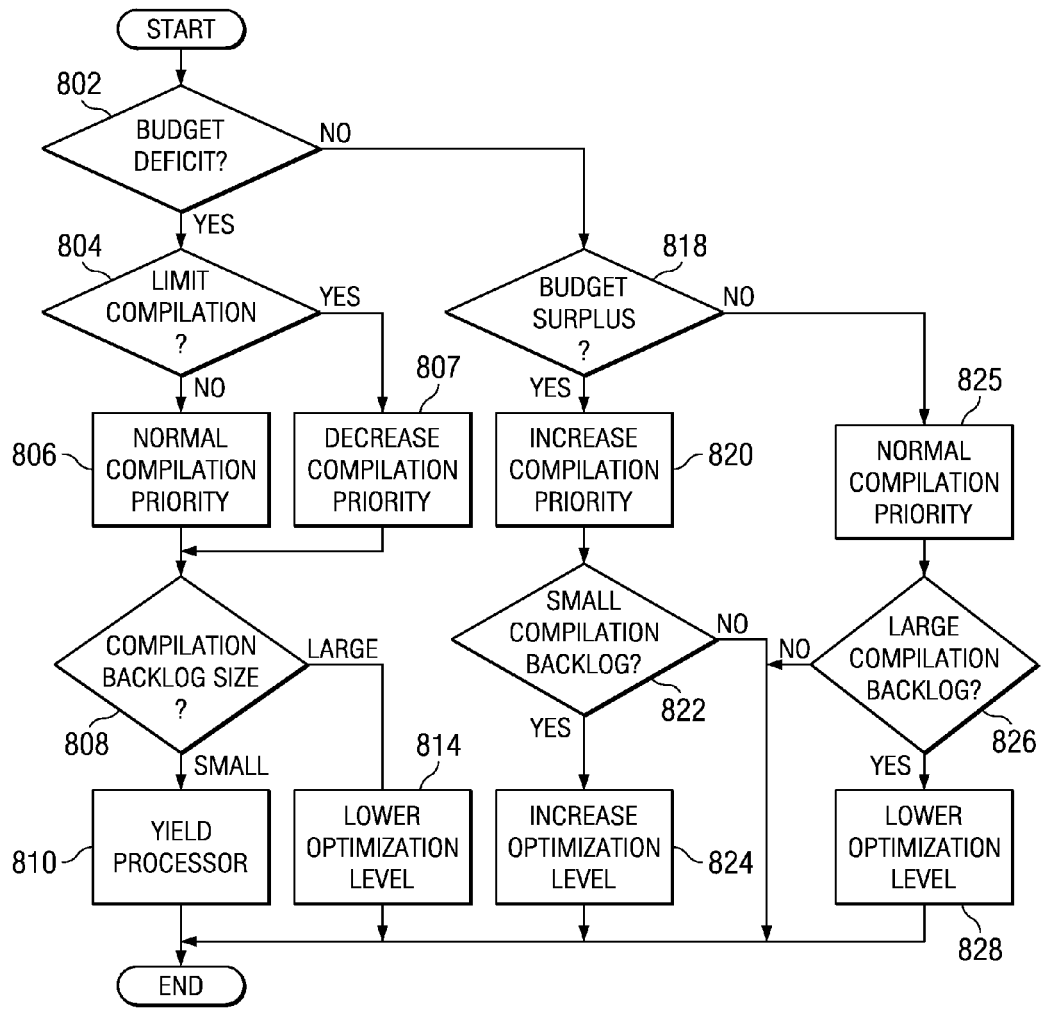
FIG. 8 is a flowchart illustrating a process for controlling allocation of processor cycles between compilation and computation threads during runtime in accordance with an illustrative embodiment.

FIG. 8 is a flowchart illustrating a process for controlling allocation of processor cycles between compilation and computation threads during runtime in accordance with an illustrative embodiment. The process in FIG. 8 is a more detailed representation of step 710 in FIG. 7. The process in FIG. 8 may be implemented by software for controlling interleaving between compilation and computation threads, such as interleaving controller 322 in FIG. 3.

The process begins by making a determination as to whether the compilation time for a current time interval exceeds a compilation budget and thus a budget deficit exists (step 802). If the compilation budget is exceeded, the process makes a determination as to whether to limit compilation to reduce the compilation deficit (step 804). If compilation does not need to be limited, the process continues compilation at a normal or current compilation priority level (step 806). If compilation should be limited, the process decreases the compilation priority of at least one compilation thread (step 807).

The process then makes a determination regarding the existing compilation backlog (step 808). If the compilation backlog is small, the process yields the processor to computation threads (step 810) and the process terminates thereafter. In contrast, if the compilation backlog is large at step 808, the process lowers an optimization level for at least one compilation thread (step 814) and the process terminates thereafter.

Returning now to step 802, if there is no budget deficit, the process makes a determination as to whether there is a budget surplus (step 818). In other words, the process determines if few processor cycles or less processor time has been used than the amount of processor cycles or the amount of processor time that is allocated. If there is a budget surplus at step 818, the process increases compilation priority (step 820) for at least one compilation thread. The process then makes a determination as to whether the compilation backlog is small (step 822) in which case the process increases the optimization level for at least one compilation thread (step 824). If the compilation backlog is large, no action is taken and the process terminates thereafter.

Returning to step 818, if there is no budget surplus, the process continues compilation at the normal or current priority level (step 825). The process then examines the compilation backlog (step 826). If the compilation backlog is large, the process lowers an optimization level for at least one compilation thread (step 828) and the process terminates thereafter. If the compilation backlog is small at step 826, the process simply ends without any other action.

Figure 9:
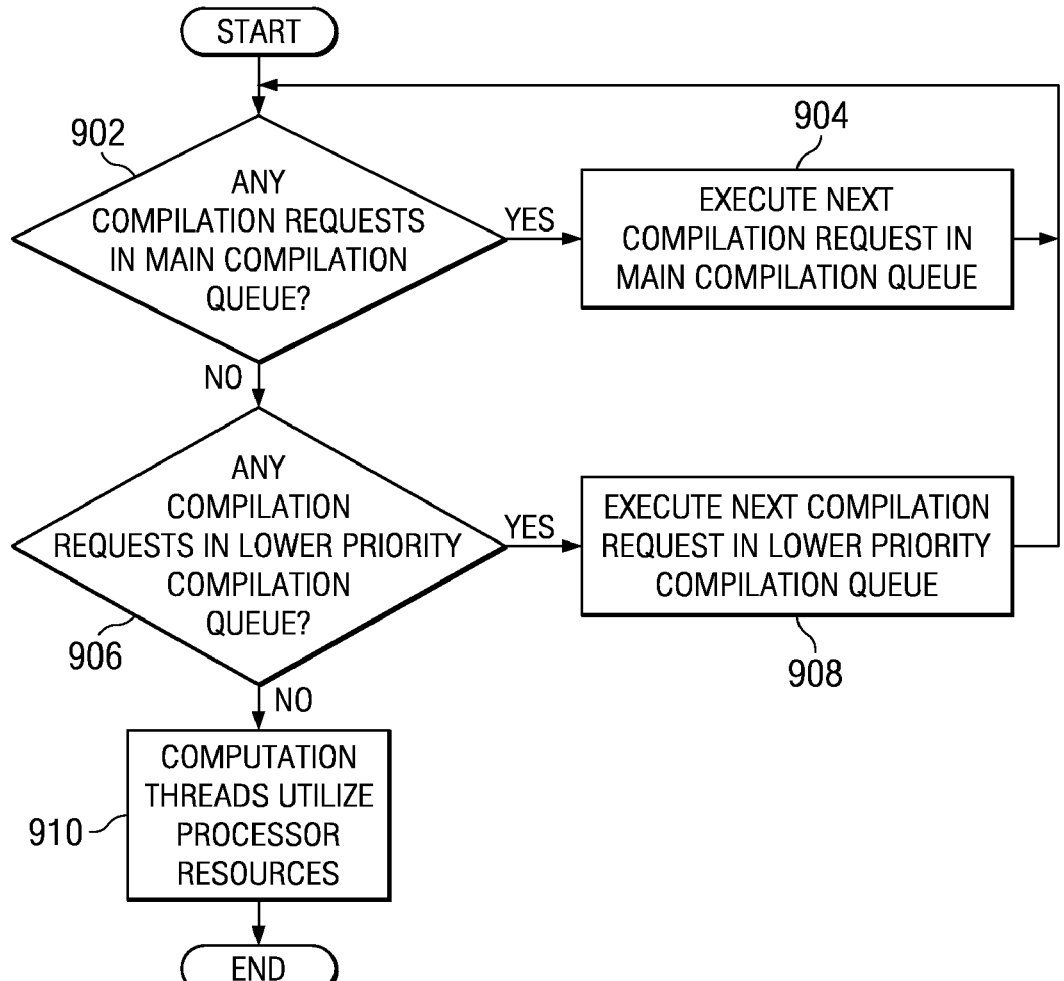
FIG. 9 is a flowchart illustrating a process for compilation of compilation threads having different compilation priority levels in accordance with an illustrative embodiment.

FIG. 9 is a flowchart illustrating a process for compilation of compilation threads having different priority levels in accordance with an illustrative embodiment. The process in FIG. 9 may be implemented by software for controlling interleaving between compilation and computation threads, such as interleaving controller 322 in FIG. 3. The process takes place during a compilation interval, such as compilation interval 402 in FIG. 4.

The process begins by making a determination as to whether any compilation requests for compiling one or more methods is present in a main compilation queue (step 902). If a compilation request is present in the main compilation queue, the process executes or compiles the next compilation request in the main compilation queue during runtime (step 904). The process then returns to step 902 and continues executing steps 902-904 until the main compilation queue is empty or no longer contains any compilation requests.

The process then makes a determination as to whether any compilation requests are present in a lower priority queue (step 906). If any compilation requests are present, the process executes or compiles the next compilation request in the lower priority queue (step 908). The process then returns to step 902 to check again for methods that might have been added to the main compilation queue. The process continues executing steps 902-908 iteratively until no compilation requests are present in main compilation queue or lower priority compilation queue Returning to step 906, if no compilation requests are in the lower priority compilation queue, at least one computation thread utilizes the processor resources (step 910) with the process terminating thereafter. In other words, when there are no compilation requests in any of the compilation queues, the compilation threads go to sleep and the computation threads can use all the processor resources for computation. When new compilation requests are added to the queue, the compilation threads are awakened to perform their computation duties.

Thus, the illustrative embodiments provide a computer implemented method, apparatus, and computer usable program code for managing just-in-time compilation. In one embodiment, the process designates a set of compilation threads for exclusively performing compilation functions associated with an application. A set of computation threads is designated for executing the application. Processor cycles are dynamically allocated during runtime between the set of compilation threads and the set of computation threads to maintain a target ratio of processor cycles consumed by the set of compilation threads to processor cycles consumed by the set of computation threads.

In this manner, the illustrative embodiments can control the compilation and computation interleaving by three mechanisms: (1) dynamically changing the priority of the compilation thread; (2) yielding the processor to computation threads; and/or (3) adjusting the optimization level of compilation. The optimization level may be adjusted upwards to increase the optimization level and initiate a more aggressive or thorough optimization of code during compilation. The more aggressive optimization typically requires more time to complete. The optimization level may also be adjusted downwards to decrease or lower the optimization level to initiate a less aggressive optimization that will result in a quicker, less time-consuming compilation of code. The illustrative embodiments use these methods to better interleave compilation with computation by not allowing the virtual machine to spend more than a certain threshold amount of processor resources on compilation tasks. The running time of short running applications in a JIT environment may be effectively improved through this interleaving process.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing just-in-time compilation, the computer implemented method comprising:
designating, by a computer, a set of compilation threads for performing compilation functions associated with an application;
designating, by the computer, a set of computation threads for executing the application;
calculating, by the computer, a ratio of processor cycles consumed by the set of compilation threads to processor cycles consumed by the set of computation threads during runtime as a function of a total amount of time spent on compilation of the application and a total amount of time spent on execution of the application; and
allocating, by the computer, processor cycles within a processor between the set of compilation threads and the set of computation threads throughout each time interval in a plurality of time intervals during runtime, wherein processor cycles within the processor are allocated between the set of compilation threads and the set of computation threads to maintain the ratio of processor cycles consumed by the set of compilation threads to processor cycles consumed by the set of computation threads within the processor throughout each time interval in the plurality of time intervals, and wherein the set of compilation threads yields the processor to the set of computation threads when a compilation time budget threshold is exceeded for the time interval in the plurality of time intervals.

2. The computer implemented method of claim 1 further comprising:
identifying, by the computer, the ratio of processor cycles consumed by the set of compilation threads to processor cycles consumed by the set of computation threads, wherein the ratio is predetermined prior to commencement of compilation.

3. The computer implemented method of claim 1 further comprising:
identifying, by the computer, the ratio of processor cycles consumed by the set of compilation threads to processor cycles consumed by the set of computation threads, wherein the ratio is a user definable ratio value that is specified by a user command.

4. The computer implemented method of claim 1 further comprising:
calculating, by the computer, the ratio of processor cycles consumed by the set of compilation threads to processor cycles consumed by the set of computation threads dynamically during runtime such that a proportion of processor cycles allocated to the set of compilation threads decreases as a total amount of time spent on compilation increases.

5. The computer implemented method of claim 1 further comprising:
calculating, by the computer, the ratio of processor cycles consumed by the set of compilation threads to processor cycles consumed by the set of computation threads dynamically during runtime such that a proportion of processor cycles allocated to the set of compilation threads increases as a total amount of time spent on compilation increases.

6. The computer implemented method of claim 1 further comprising:
identifying, by the computer, the ratio of processor cycles consumed by the set of compilation threads to processor cycles consumed by the set of computation threads, wherein the ratio is a constant value.

7. The computer implemented method of claim 1 wherein allocating, by the computer, processor cycles between the set of compilation threads and the set of computation threads during runtime further comprises:
changing, by the computer, a compilation priority level for a compilation thread in the set of compilation threads.

8. The computer implemented method of claim 1 wherein allocating, by the computer, processor cycles between the set of compilation threads and the set of computation threads during runtime further comprises:
changing, by the computer, an optimization level of a compilation thread in the set of compilation threads.

9. A computer program product stored on a computer readable storage device including computer usable program code that is executable by a computer for managing just-in-time compilation, the computer program product comprising:
computer usable program code for designating a set of compilation threads for performing compilation functions associated with an application;
computer usable program code for designating a set of computation threads for executing the application;
computer usable program code for calculating a ratio of processor cycles consumed by the set of compilation threads to processor cycles consumed by the set of computation threads as a function of a total amount of time spent on compilation of the application and a total amount of time spent on execution of the application; and
computer usable program code for allocating processor cycles within a processor between the set of compilation threads and the set of computation threads throughout each time interval in a plurality of time intervals during runtime, wherein processor cycles within the processor are allocated between the set of compilation threads and the set of computation threads to maintain the ratio of processor cycles consumed by the set of compilation threads to processor cycles consumed by the set of computation threads within the processor throughout each time interval in the plurality of time intervals, and wherein the set of compilation threads yields the processor to the set of computation threads when a compilation time budget threshold is exceeded for the time interval in the plurality of time intervals.

10. The computer program product of claim 9 further comprising:
computer usable program code for identifying the ratio of processor cycles consumed by the set of compilation threads to processor cycles consumed by the set of computation threads, wherein the ratio is predetermined prior to commencement of compilation.

11. The computer program product of claim 9 further comprising:
computer usable program code for calculating the ratio of processor cycles consumed by the set of compilation threads to processor cycles consumed by the set of computation threads dynamically during runtime such that a proportion of processor cycles allocated to the set of compilation threads decreases as a total amount of time spent on compilation increases.

12. The computer program product of claim 9 further comprising:
computer usable program code for changing a compilation priority level for a compilation thread in the set of compilation threads to maintain the ratio of processor cycles consumed by the set of compilation threads to processor cycles consumed by the set of computation threads.

13. The computer program product of claim 9 further comprising:
computer usable program code for changing an optimization level for a compilation thread in the set of compilation threads to maintain the ratio of processor cycles consumed by the set of compilation threads to processor cycles consumed by the set of computation threads.

14. An apparatus for managing just-in-time compilation, the apparatus comprising:
a bus system;
a memory coupled to the bus system, wherein the memory stores computer usable program code; and
a processor coupled to the bus system, wherein the processor executes the computer usable program code to designate a set of compilation threads for performing compilation functions associated with an application; designate a set of computation threads for executing the application; calculate a ratio of processor cycles consumed by the set of compilation threads to processor cycles consumed by the set of computation threads during runtime as a function of a total amount of time spent on compilation of the application and a total amount of time spent on execution of the application; and allocate processor cycles within the processor between the set of compilation threads and the set of computation threads throughout each time interval in a plurality of time intervals during runtime, wherein processor cycles within the processor are allocated between the set of compilation threads and the set of computation threads to maintain the ratio of processor cycles consumed by the set of compilation threads to processor cycles consumed by the set of computation threads within the processor throughout each time interval in the plurality of time intervals, and wherein the set of compilation threads yields the processor to the set of computation threads when a compilation time budget threshold is exceeded for the time interval in the plurality of time intervals.

15. The apparatus of claim 14 wherein the processor further executes the computer usable program code to change a compilation priority level for a compilation thread in the set of compilation threads to maintain the ratio of processor cycles consumed by the set of compilation threads to processor cycles consumed by the set of computation threads.

16. A data processing system for managing just-in-time compilation, the data processing system comprising:
   a processor; and
   a virtual machine, wherein the virtual machine further comprises:
   a just-in-time compiler, wherein the just-in-time compiler compiles byte code for an application during runtime; and
   an interleaving controller, wherein the interleaving controller designates a set of compilation threads for performing compilation functions associated with the application; designates a set of computation threads for executing the application; calculates a ratio of processor cycles consumed by the set of compilation threads to processor cycles consumed by the set of computation threads during runtime as a function of a total amount of time spent on compilation of the application and a total amount of time spent on execution of the application; and allocates processor cycles within the processor between the set of compilation threads and the set of computation threads throughout each time interval in a plurality of time intervals during runtime, wherein processor cycles within the processor are allocated between the set of compilation threads and the set of computation threads to maintain the ratio of processor cycles consumed by the set of compilation threads to processor cycles consumed by the set of computation threads within the processor throughout each time interval in the plurality of time intervals, and wherein the set of compilation threads yields the processor to the set of computation threads when a compilation time budget threshold is exceeded for the time interval in the plurality of time intervals.

\* \* \* \* \*